UNITED STATES PATENT OFFICE.

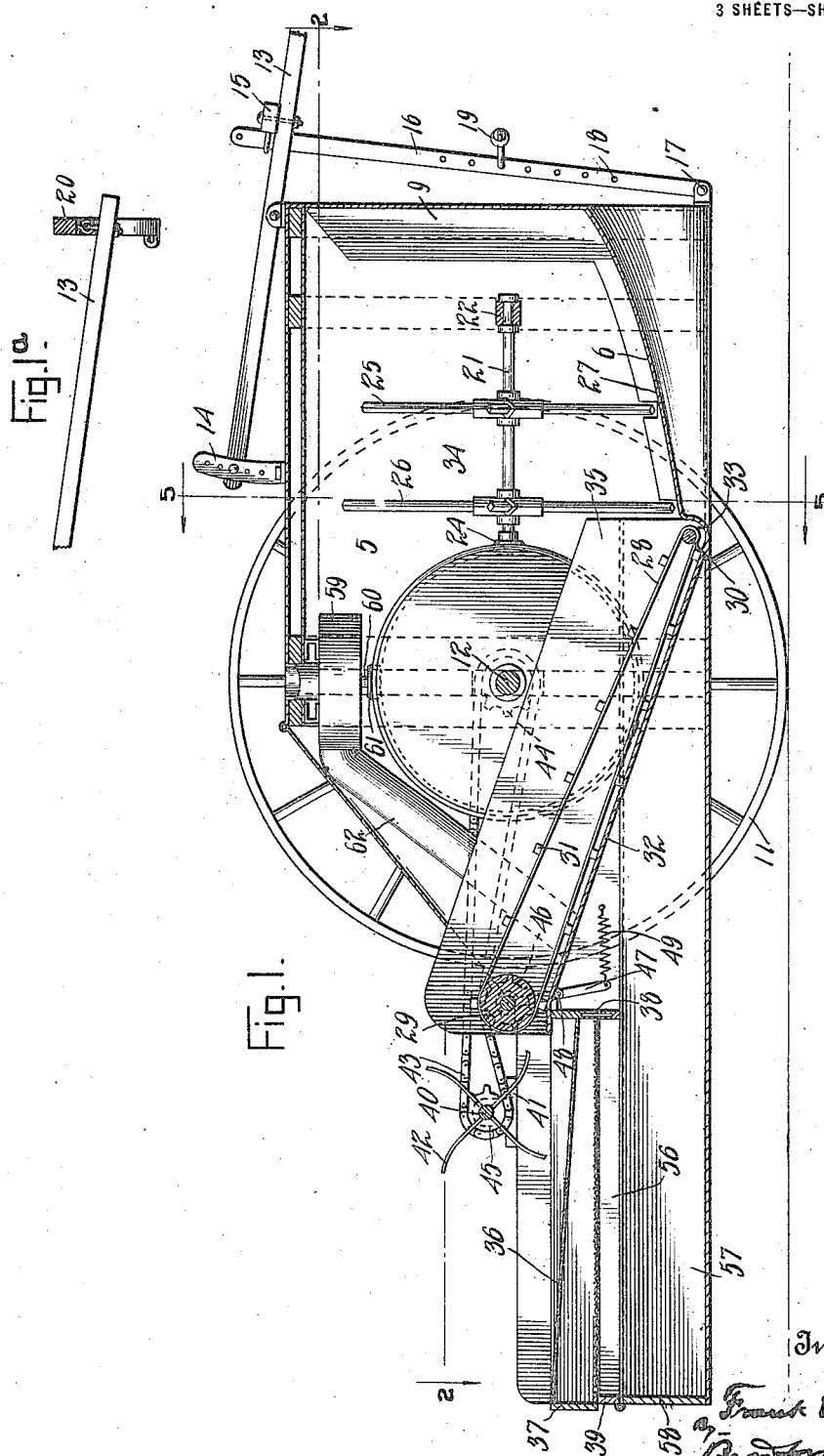

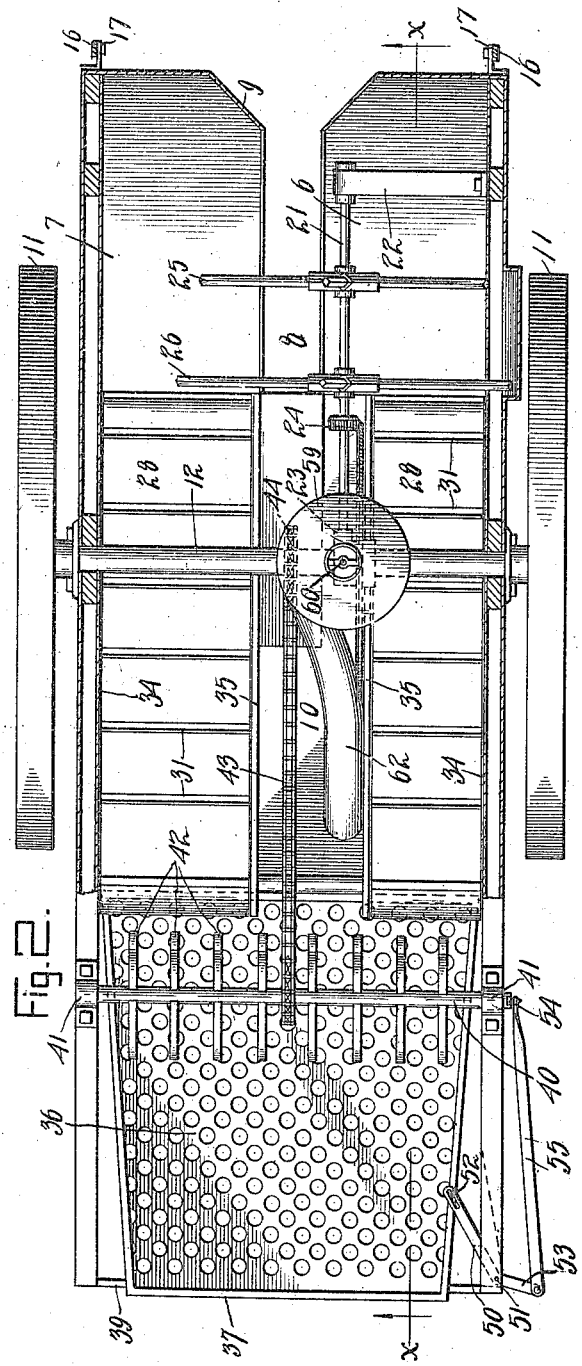

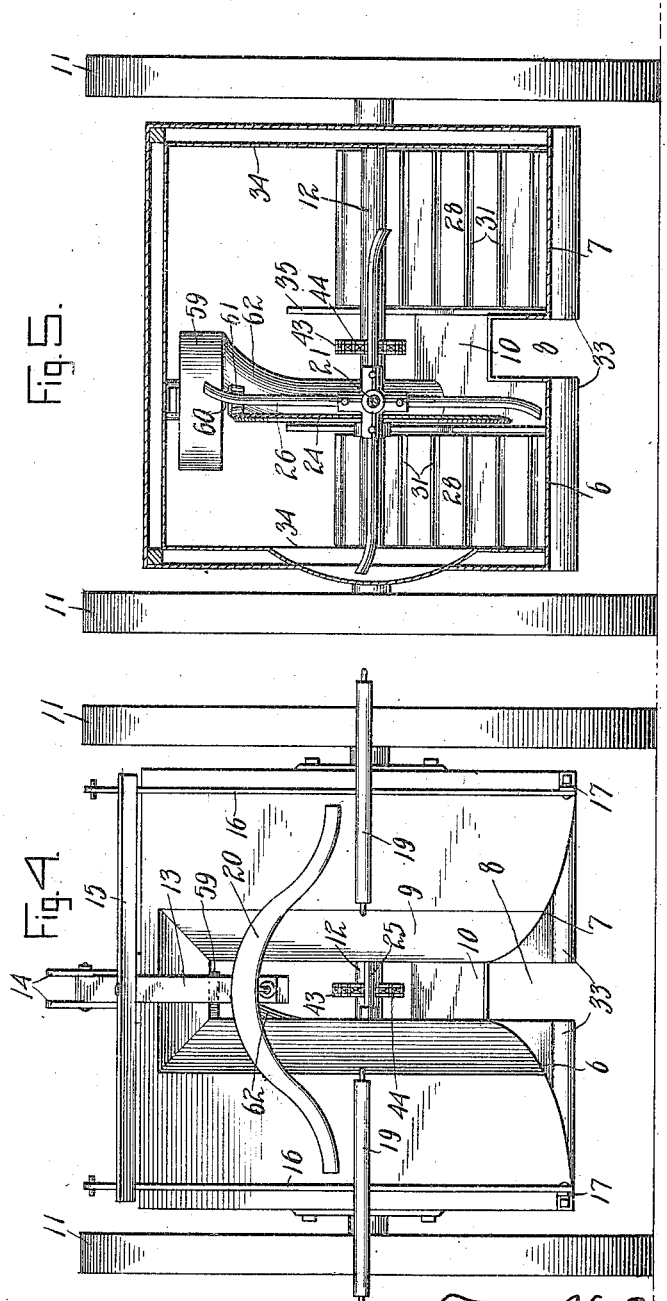

FRANK V. SCOTT, OF ELIZABETH CITY, NORTH CAROLINA.

PEA-HARVESTER.

1,270,448.  Specification of Letters Patent.  Patented June 25, 1918.

Application filed June 15, 1917. Serial No. 174,995.

*To all whom it may concern:*

Be it known that I, FRANK V. SCOTT, a citizen of the United States, residing at Elizabeth City, Pasquotank county, and State of North Carolina, have invented and discovered certain new and useful Improvements in Pea-Harvesters, of which the following is a specification.

The invention relates to improvements in pea harvesters and consists in the arrangements and combinations of elements hereinafter described and particularly set forth in the accompanying claims.

The invention has for its purpose to construct a pea harvesting machine which will gather the peas from the vines and deliver the same to a sorting and screening apparatus mounted in the vehicle and operable through the travel thereof to the end of collecting the peas free from foreign matter in a more effective manner and in less time than is possible with the present used apparatus.

The present apparatus is proposed as an improvement over the type of pea harvester in the co-pending application bearing Serial Number 153,362, dated March 8, 1917, and embodies an arrangement and correlation of elements operable to produce the results stated therein in a more effective manner.

The invention is disclosed by way of illustration in the accompanying drawings, wherein—

Figure 1 is a longitudinal sectional view of the pea harvester, taken on the line *x—x* of Fig. 2.

Fig. 1ª shows a detail of the draft gear employed.

Fig. 2 is a horizontal sectional view taken on the line 2—2 of Fig. 1.

Fig. 3 is a detail view of the spreader device.

Fig. 4 is a front elevational view of the harvester, and

Fig. 5 is a transverse sectional view taken on the line 5—5 of Fig. 1.

Referring to the construction in further detail and wherein like reference characters designate corresponding parts, the harvester consists of a vehicle comprising a body 5 constructed in two similar sections 6 and 7, to provide a pathway 8 (see Figs. 2 and 4) running the length of the harvester and through which the pea vines pass in the traveling of the vehicle. The pea vines are gathered and directed into the pathway 8 by the entrance-way formed by the converging portions 9 at the front of the vehicle and a downwardly disposed surface 10 constricts the passageway to gather and discharge the vines at the rear while the vehicle travels, as will be understood.

The vehicle is mounted on the pair of wheels 11 journaled on the axle 12 in the manner of a cart, and a tongue 13 for the draft gear is adjustably connected to the clevis or perforated arm 14 mounted on the top wall of the vehicle body, as shown (see Fig. 1). The tongue 13 carries a cross-bar 15, to either end of which is suitably secured an upright bar 16 that is pivotally secured to the vehicle body at the lower end and at one side as at 17. Each of said pivoted bars 16 is formed with a plurality of perforations 18 for adjustably mounting the swingle-trees 19 in accordance with the draft animals employed, and a yoke 20 is carried at the front end of the tongue 13 (see Figs. 1ª and 4). The vehicle body is therefore adapted to be angularly adjusted on the axle all in accordance with the nature of work engaged and the size and kind of animal employed.

The thresher consists of a shaft 21, suitably journaled in the bracket 22 on the frame and bearing 23 on axle 12; and said shaft 21 is connected to be driven from the vehicle axle by a miter-gear 24, or any other suitable driving connection may be employed. A plurality of beaters comprising arms 25 and 26 are secured to said shaft, and said arms have turned end portions and are of different lengths, respectively, to the end that the thresher will beat the peas off the vines in different locations, *i. e.*, the vines will be subjected to uniform threshing, and as a result the entire crop will be harvested. The bottom walls of the compartments 6 and 7 are constructed with inwardly and downwardly curved portions 27 (see Fig. 1) to offer the least resistance to the pea vines encountered and to direct the material beat from the vines to locations where the same may be readily carried by suitable conveyers to the separating and screening units of the harvester.

There are two of these conveyers, one operating in each of the sections, and each of said conveyers consists of an endless belt 28 inclined upwardly and rearwardly and traveling on the pulleys 29 and 30. The belt is provided with a number of strips or bars 31 spaced in the usual manner of conveyer belts, and along the returning length of the belt there is a wall 32 against the surface of which said strips 31 bear and thereby provide a path which will be kept clean of any obstructing foreign matter. The carrying lengths of the conveyer belts receive the material that is beat from the vines at the trough 33, and discharge such material onto the spreading device that is located at the rear of the vehicle. The outer edges of the carrying belts work closely against the inner side walls 34 of the vehicle body and the inner edges of the belts are disposed against upright guards or plates 35 (see Figs. 1 and 2).

The apparatus which receives the material discharged by the conveyers spreads such material and consists of a tray or perforated plate 36 supported on an incline in the frame 37, and said frame is pivotally mounted on the pin 38 at the front end, and at its rear end is supported on the cross piece 39 (see Fig. 2).

The material is deposited on the perforated tray in a layer of substantially uniform thickness by a feeder comprising a shaft 40 journaled in the bearings 41 on the frame and having a plurality of uniformly spaced arms 42, and said arms operate to disintegrate the vegetative mass as it comes from the belts and force the same in the form of a layer across the tray and toward the rear. The shaft 40 is connected to be driven from the vehicle shaft 12 by a chain 43 that rides on sprockets 44 and 45 secured to said shafts 12 and 40, respectively.

The pulley 29 of the conveyer belts is connected to be operated from the chain 43 by a sprocket 46 on said pulley and to give the necessary pliability to the conveyer belts, and provide a take-up for the chain 43, said pulley is journaled on arms 47 that are fulcrumed on the frame as at 48, and the said arms are tensioned by the springs 49.

The perforated plate 36 is adapted to be agitated or oscillated from the shaft 40 by means of the arm 50 fulcrumed on the frame at 51, and having a slot and pin engagement 52 with the frame 37. The lever end 53 of the arm 50 derives movement from the crank 54 on the shaft 40, through the connecting rod 55.

A screen 56 is mounted in the vehicle body immediately beneath the frame 37, and is of such mesh that the peas may readily pass therethrough and into the compartment 57, which is the pea receptacle for the vehicle. A gate 58 is swingingly mounted on the vehicle body at the rear, and gives ready access for removing the peas collected in the compartment 57.

A fan or blower (not shown) is mounted in a casing 59 on the shaft 60, and is connected to be driven from the axle gear wheel 24 by the pinion 61, as shown (see Fig. 1).

A pipe 62 leads from the blower casing 59, and discharges the air blast into the vehicle body at a point just in advance of the screen 56, in such a manner that the air blast will carry off all foreign matter upwardly through the screen 56 and tray 36, and leave only the separated peas in clean condition.

It is obvious that those skilled in the art may vary the details of construction and arrangement of parts without departing from the spirit of the invention, and I therefore do not wish to be limited to such features except as may be required by the claims.

Having thus described said invention, what is claimed and desired to be secured by Letters Patent is:—

1. A pea harvester comprising a wheeled vehicle having an opening to receive the tops of the pea vines, a beater mounted on one side of said opening and operable through the travel of the vehicle, conveyers for carrying the material received in the vehicle located on both sides of the beater, a screen for separating the peas from the material, a blower associated with the screen, and means for operating the screen, conveyers and blower through the travel of the vehicle, substantially as set forth.

2. A pea harvester comprising a wheeled vehicle having an opening to receive the tops of the pea vines and adapted to collect the material therefrom at the end of the vehicle, a beater operable through the travel of the vehicle, a conveyer for carrying the collected material to the rear end of the vehicle, means for spreading the material from the conveyer, a screen for separating the peas from said material, a blower associated with the screen, and means for operating the conveyer, spreading means and blower through the travel of the vehicle, substantially as set forth.

3. A pea harvester comprising a wheeled vehicle having an opening to receive the tops of the pea vines and having an inclined bottom wall adapted to collect the material beat from said vines, a beater operable through the travel of the vehicle, an endless conveyer for carrying the collected material to the rear end of the vehicle, a perforated plate adapted to receive the material from said conveyer, means operable through the conveyer to spread the material on said perforated plate, means for agitating said perforated plate, a screen located beneath the perforated plate, a blower associated with the screen, and means for operating the conveyer and blower through the travel of the vehicle, substantially as set forth.

4. A pea harvester comprising a wheeled vehicle having an opening to receive the tops of the pea vines and having an inclined bottom wall adapted to collect the material beat from said vines, a beater operable through the travel of the vehicle, an endless conveyer for carrying the collected material to the rear end of the vehicle, a perforated plate adapted to receive the material from said conveyer, means operable through the conveyer to spread the material over said perforated plate, means for agitating said perforated plate by said material spreading means, a screen located beneath the perforated plate, a blower associated with the screen, and means for operating the conveyer and blower through the travel of the vehicle, substantially as set forth.

5. A pea harvester comprising a wheeled vehicle having an opening to receive the tops of the pea vines, a beater operable through the travel of the vehicle, means for spreading out and sorting the material received in the vehicle, a conveyer for delivering the material to said spreading and sorting means, a fan mounted on the vehicle, an air duct from the fan disposed to discharge the air blast therefrom upwardly and rearwardly through said spreading and sorting means, and means for operating the conveyer and fan through the travel of the vehicle, substantially as set forth.

6. In a pea harvester the combination of a wheeled vehicle constructed with parallel side sections having a passageway therebetween for the passage of the pea vines, a beater for knocking the peas from the vines into said sections, conveyers operating in the said sections, a perforated tray adapted to receive the material discharged from the conveyers, a rotatable shaft having arms adapted to uniformly distribute the material over said tray, means for operating said shaft from the vehicle, and means for agitating the tray from said shaft.

7. In a pea harvester the combination of a wheeled vehicle constructed with parallel side sections having a passageway therebetween for the passage of the pea vines, a beater for knocking the peas from the vines into said sections, conveyers operating in the said sections, a perforated tray adapted to receive the material discharged from the conveyers, a rotatable shaft having arms adapted to uniformly distribute the material over said tray, a chain driving connection between said shaft and the vehicle, a driving connection between said chain and the conveyers, and operative connections between said shaft and the tray for agitating said tray, substantially as set forth.

8. In a pea harvester the combination of a wheeled vehicle constructed with parallel side sections having a passageway therebetween for the passage of the pea vines, the adjacent walls of said sections having inwardly and downwardly curved portions to direct the pea vines encountered and providing guides within the section to gather the material beat from the vines, a beater operable from the vehicle, conveyers in said sections for removing the material collected therein, means for operating the conveyers from the vehicle, and means on the vehicle for separating and gathering the peas discharged from the conveyers, substantially as set forth.

In witness whereof, I have hereunto set my hand and seal at Elizabeth City, North Carolina, this 13th day of June, A. D. nineteen hundred and seventeen.

FRANK V. SCOTT. [L. S.]

Witnesses:
Jas. M. Albert,
W. H. Jennings.

Copies of this patent may be obtained for five cents each, by addressing the "Commissioner of Patents, Washington, D. C."